(12) United States Patent
Bauer

(10) Patent No.: US 6,628,993 B1
(45) Date of Patent: Sep. 30, 2003

(54) METHOD AND ARRANGEMENT FOR THE MUTUAL MONITORING OF CONTROL UNITS

(75) Inventor: Torsten Bauer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 09/618,565

(22) Filed: Jul. 17, 2000

(30) Foreign Application Priority Data

Jul. 15, 1999 (DE) .......................................... 199 33 086

(51) Int. Cl.[7] .............................................. G05B 11/01
(52) U.S. Cl. .............................. 700/20; 700/18; 700/19; 700/9; 700/86; 700/87; 318/563; 318/568.1; 318/560; 318/561; 340/506; 340/3.1; 340/511; 701/101; 701/102; 701/107; 701/114
(58) Field of Search .......................... 700/9, 82, 19–20, 700/18, 86–88; 318/563, 568.1, 560, 561; 340/506, 3.1, 511; 701/31, 101, 107, 102, 114, 108–110; 123/350, 396, 399, 339.15, 397

(56) References Cited

U.S. PATENT DOCUMENTS

| | | | | |
|---|---|---|---|---|
| 4,538,138 A | * | 8/1985 | Harvey et al. ............... | 340/521 |
| 4,787,136 A | * | 11/1988 | Majic .......................... | 29/709 |
| 4,821,215 A | * | 4/1989 | Woodward ................... | 702/127 |
| 4,853,932 A | * | 8/1989 | Nitschke et al. .............. | 714/17 |
| 4,962,570 A | * | 10/1990 | Hosaka et al. ............... | 123/399 |
| 5,880,568 A | | 3/1999 | Bederna et al. ............. | 318/563 |
| 5,907,491 A | * | 5/1999 | Canada et al. .............. | 700/108 |
| 5,922,050 A | * | 7/1999 | Madany ...................... | 709/222 |
| 6,125,322 A | * | 9/2000 | Bischof et al. ............. | 701/114 |
| 6,222,448 B1 | * | 4/2001 | Beck et al. .................. | 340/506 |
| 6,393,356 B1 | * | 5/2002 | Clement et al. ......... | 315/169.3 |

\* cited by examiner

*Primary Examiner*—Ramesh Patel
(74) *Attorney, Agent, or Firm*—Walter Ottesen

(57) ABSTRACT

A method and an arrangement mutually monitor control units. The control units are built up of three program levels. A first level is for executing the control apparatus functions and a second level is provided for monitoring the control apparatus functions and a third level is for monitoring the programs of the second level. A first control unit sends out a selected question to a second control unit which answers the same in the context of a sequence control. The second control unit sends the formed answer back to the first control unit which then, on the basis of a comparison of the formed answer to the expected answer, determines the freedom from fault of the second control unit. Correspondingly, the first control unit is monitored by the second control unit via communication.

6 Claims, 1 Drawing Sheet

METHOD AND ARRANGEMENT FOR THE MUTUAL MONITORING OF CONTROL UNITS

BACKGROUND OF THE INVENTION

A method and an arrangement for the mutual monitoring of control units is disclosed in U.S. Pat. No. 5,880,568. Here, an intrinsically safe control unit is described such as in combination with control systems for controlling the drive unit of a vehicle. Intrinsically safe means that, if a fault occurs, the fault condition remains limited to the system wherein the fault has occurred and the system remains in a safe state with respect to the outside. For example, individual faults may not lead to an increase of the power of the drive unit. The monitoring concept which is described in U.S. Pat. No. 5,880,568, is structurally of two channels, that is, all safety-relevant paths are made secure by redundant channels. This applies also for the safety relevant components of the operative software (for example, the software for satisfying the task of the control unit). This operative software is monitored in the context of a second program level by redundant software which quantitatively checks the correct formation of the control signal quantities by the operative software. The sequence and the functionality of the software of this second level is monitored by communication with an external monitoring module in the context of a question-answer communication.

Specifically, the first software level in the known embodiment contains the operative software for executing the control function as well as system-specific monitoring functions of the input quantities and the output stages. The second level comprises the function monitoring.

In the function monitoring, the correct formation of the output quantities and especially the power-determining quantities is monitored by means of redundant functions. Furthermore, the programs of the second level form the answer to selected questions, which are transmitted from the monitoring module in the context of a sequence control. With the aid of these questions, the correct computation of the monitoring functions is checked and the programs execute a computer monitoring by means of a test of the monitoring functions via simulation data. The third level includes the question-answer communication (on the basis of the transmitted question and the formed answer) with the monitoring module with the aid of which the functionality of the programs of the second level is monitored. Furthermore, monitoring functions are assigned to this level and check the components of the function computer such as memories, analog/digital converters, et cetera. A procedure of this kind is known from the above-mentioned state of the art.

In modern control systems, several control units are, as a rule, utilized which form separate components or are structurally united in an apparatus. Accordingly, in a modern vehicle control, for example, control apparatuses are present for controlling the following: the drive unit, the driving performance (ABS, ASR, ESP), an automatic transmission, the wheel brakes, et cetera. For intrinsic safety of these individual control apparatuses, each individual control apparatus would have to be monitored in the sense of the above-mentioned state of the art. This is associated with relatively large complexity. The same applies to at least two control units united in one apparatus (for example, computers) which execute these functions.

SUMMARY OF THE INVENTION

It is an object of the invention to provide measures for an improved monitoring of at least two control units (control apparatuses, computers, et cetera) which operate as a composite.

The method of the invention is for mutual monitoring of at least first and second control units, the first and second control units each having first, second and third program levels (I, II, III). The method includes the steps of: allocating a first program to the first program level (I) of each control unit for computing control functions; allocating a second program to the second program level (II) of each control unit for monitoring the operability of the first program of the first program level (I); allocating a third program to the third program level (III) for monitoring the operability of the second program; the third program of the third program level (III) forming an answer based on a pregiven question with the aid of the second program in the context of a sequence control; and, causing one of the control units to receive the question of the other one of the control units and to output the answer to the other one of the control units.

The procedure described below permits the mutual monitoring of at least two control units which are connected to each other in an interconnected system (for example, a system of several control apparatus). With this system, several control functions are carried out with mutual influencing of the control units. It is especially advantageous that the monitoring is executed with less complexity notwithstanding the usual reliability than would be the case for an intrinsically safe individual monitoring of each individual control unit. This is so because the monitoring module becomes superfluous because of the mutual monitoring of the control units. This monitoring module is known from the state of the art in connection with the monitoring of an individual computer. The consequence is a considerable savings potential in the development of intrinsically safe control units.

It is especially advantageous to use the reliable and tested procedure known from the state of the art for mutual monitoring of the control units. This permits that, in the usual manner, safety and availability of the control system are guaranteed without the need for providing additional complexity with respect to the monitoring of the control units.

BRIEF DESCRIPTION OF THE DRAWINGS

The invention will now be described with reference to the single sheet of drawing (FIG. 1).

DESCRIPTION OF THE INVENTION EMBODIMENTS OF THE INVENTION

Figure 1:
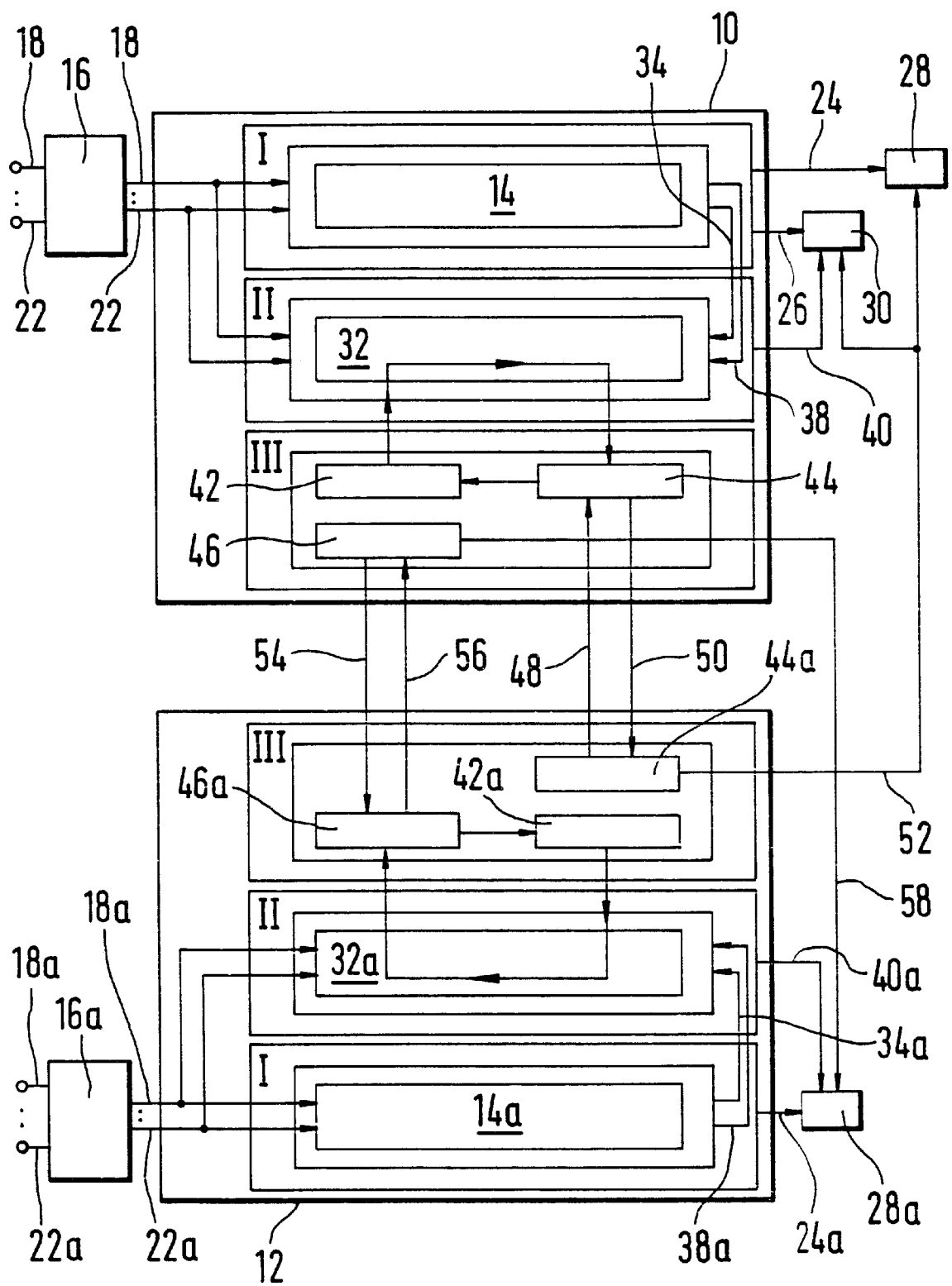
FIG. 1 shows a preferred embodiment of the mutual monitoring of two control apparatus of a control apparatus network wherein one control apparatus is a control apparatus for controlling the drive unit of the vehicle.

FIG. 1 shows a first control apparatus 10 which, in the preferred embodiment, functions to control an internal combustion engine as well as a second control apparatus 12 which functions to control the following: driving performance, a brake system and/or an automatic transmission. Both control apparatus include respective computers which are shown in FIG. 1. Each computer has program levels I to III as shown. To each level I, the functions are allocated which ensure the control function, that is, the actual control tasks, as well as system-specific monitoring functions of the input quantities and output stages. In FIG. 1, this is identified by respective programs 14 and 14a. Input quantities are supplied from measuring devices (not shown) via input circuit 16 and via input lines 18 to 22 to control apparatus 10. Likewise, input quantities are transmitted from measuring devices (not shown) via input lines 18a to 22a and via input circuit 16a to control apparatus 12. These input quantities are the basis for the computation of the control functions. For this reason, the input quantities are made available to the programs of level I. The programs of the first level form actuating quantities on the basis of the input quantities. In the case of control apparatus 10, the actuating quantities are transmitted via output lines 24 and 26 to the end stages 28 and 30, respectively. In the case of control apparatus 12, the actuating quantity is transmitted via output line 24a to end stage 28a.

In the preferred embodiment, the control apparatus 10 is a control apparatus for controlling an internal combustion engine. The output stage 28 defines output stages for controlling the injection valves and the ignition devices, et cetera; whereas, the output stage 30 represents an output stage for actuating an electrically-actuable throttle flap of the engine. Depending upon the application, the control apparatus 12 controls output stages for actuating clutches of an automatic transmission, of brake actuating devices, et cetera.

As known from the state of the art mentioned initially herein, respective programs 32 and 32a are assigned to the second levels II. These programs monitor the functionality of the programs of the first level and thereby monitor the functionality of the control function. In the preferred embodiment, this is executed on the basis of input and output quantities so that the input quantities are supplied to the programs of the second level in a manner redundant to the programs of the first level. Furthermore, output quantities or intermediate quantities of the programs of the first level are supplied from the first level to the second level via the lines 34 to 38 in the case of control apparatus 10 and via lines 34a to 38a in the case of control apparatus 12. The programs of the second level determine the operability and/or a defective operation of the programs of the first level by comparing these quantities and/or quantities derived therefrom. To ensure operational safety, it is provided that at least one of the output stages (for example, the output stage 30 of the control unit 10) is enabled via an output line 40 or 40a by the programs of the second level in the case where there are no faults, or, in the case of a fault, the output stage can be switched off.

The third program level III includes programs which check the functionality of the programs of the level II as well as of components of the computer. In the context of monitoring, the programs of this level communicate with external components. In the initially-mentioned state of the art, the communication is with a monitoring module and, in the case of the present procedure, the communication is with the other control apparatus (12 or 10).

The level III includes programs such as storage test programs 42 or 42a, programs for sequence control (44 or 44a) and programs for testing external apparatus (46 or 46a).

The state of the art initially mentioned herein describes an individual monitoring of a control apparatus. In this state of the art, the programs of the sequence control of the level III are connected to a monitoring module. In the present case, this connection of the programs of the sequence control is made available with the programs of the external apparatus test of the other control apparatus. In this way, the programs of the external apparatus test 44a of the control apparatus 12 put predetermined questions via the communications connection 48 to the sequence control 44 of the control apparatus 10 as known from the initially-mentioned state of the art. The sequence control programs 44 of the control apparatus 10 cause the programs of the level II to form answers via the storage control programs 42. These answers are then combined to a total answer and are transmitted by the programs of the sequence control via the communications connection 50 to the programs of the external apparatus test of the control apparatus 12 for evaluation. These programs of the external apparatus test compare the answer, which is to be expected in response to the posed question, with the actual answer and determine therefrom the operational capability of the programs of the level II of the control apparatus 10. The programs of the external apparatus test of the control apparatus 12 intervene in at least one of the output stages 28 and 30 via an output line 52. These output stages 28 and 30 receive output quantities of the control apparatus 10. In the case of a fault, the output stages are switched off or are enabled in the case where there is no fault.

A corresponding procedure is provided to monitor the control apparatus 12, that is, external apparatus test programs 46, communication lines 54 and 56, and output line 58, which communicate with each other in the context of the monitoring in correspondence to the above illustration, and intervene in at least one output stage.

In this way, it is ensured that the two control apparatuses 10 and 12 mutually monitor each other and the external effect of the apparatus, which has been determined as having a fault, is confined by the other apparatus. A preferred specific procedure of the sequence control is described, for example, in the state of the art initially mentioned herein.

In addition to the monitoring of two control apparatus, which are structurally separate, a monitoring of two computer units (in general, control units) is carried out where the two computer units are united structurally in a control apparatus.

It is understood that the foregoing description is that of the preferred embodiments of the invention and that various changes and modifications may be made thereto without departing from the spirit and scope of the invention as defined in the appended claims.

What is claimed is:

1. A method for mutual monitoring of at least first and second control units, said first and second control units each having first, second and third program levels (I, II, III); and, the method comprising the steps of:

allocating a first program to said first program level (I) of each control unit for computing control functions;

allocating a second program to said second program level (II) of each control unit for monitoring the operability of said first program of said first program level (I);

allocating a third program to said third program level (III) for monitoring the operability of said second program; said third program of said third program level (III) forming an answer based on a pregiven question with the aid of said second program in the context of a sequence control; and, causing one of said control units to receive the question of the other one of said control units and to output the answer to said other one of said control units.

2. The method of claim 1, wherein each one of said control units forms questions for the other one of said control units and said each one of said control units transmits answers to the other one of said control units.

3. The method of claim 1, wherein a question is formed by programs of the third level of the second control unit and is transmitted to the first control unit; whereas, the answers are received by the second control unit and are evaluated thereby.

4. The method of claim 1, wherein programs of the third level of a control unit intervene in end stages in the manner of a switchoff or enablement of the other control unit.

5. The method of claim 1, wherein said first control unit is a control unit for controlling an internal combustion engine; whereas, said second control unit carries out a control of at least one of the following: driving behavior, wheel brakes and an automatic transmission.

6. An arrangement for mutual monitoring of at least first and second control units, said first and second control units each having first, second and third program levels (I, II, III); and, the arrangement comprising:

means for allocating a first program to said first program level (I) of each control unit for carrying out control functions;

means for allocating a second program to said second program level (II) of each control unit for monitoring the operability of said first program of said first program level (I);

means for allocating third programs to said third program level (III) for monitoring the operability of said second program; said third programs of said third program level (III) including a sequence control which forms an answer based on a pregiven question with the aid of said second program of said second program level (II); and, said one control unit including means for receiving the question of the other one of said control units and to output the answer to said other one of said control units.

* * * * *